(12) United States Patent
Sudau et al.

(10) Patent No.: US 7,216,750 B2
(45) Date of Patent: May 15, 2007

(54) CLUTCH ARRANGEMENT

(75) Inventors: Jörg Sudau, Niederwerrn (DE); Khalid Jafoui, Trunstadt (DE); Jürgen Ackermann, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 188 days.

(21) Appl. No.: 10/514,069

(22) PCT Filed: Jul. 5, 2003

(86) PCT No.: PCT/EP03/07223

§ 371 (c)(1),
(2), (4) Date: Nov. 10, 2004

(87) PCT Pub. No.: WO2004/013508

PCT Pub. Date: Feb. 12, 2004

(65) Prior Publication Data

US 2006/0163023 A1    Jul. 27, 2006

(30) Foreign Application Priority Data

Jul. 31, 2002    (DE) ............................. 102 34 822

(51) Int. Cl.
*F16D 13/64* (2006.01)
(52) U.S. Cl. ............................. 192/70.12; 192/113.34
(58) Field of Classification Search .................. None
See application file for complete search history.

(56) References Cited

U.S. PATENT DOCUMENTS

| | | | |
|---|---|---|---|
| 2,141,164 A * | 12/1938 | Brehm | 192/107 R |
| 3,025,686 A | 3/1962 | Lewis | |
| 3,249,189 A * | 5/1966 | Schjolin et al. | 192/70.12 |
| 3,648,545 A | 3/1972 | Clancey | |
| 3,897,860 A | 8/1975 | Borck et al. | |
| 6,360,864 B1 | 3/2002 | Thomas et al. | |
| 6,394,243 B1 | 5/2002 | Sasse | |
| 6,910,561 B2 * | 6/2005 | Sasse | 192/70.12 |
| 2004/0069586 A1 | 4/2004 | Sasse et al. | |
| 2004/0195068 A1 * | 10/2004 | Sudau | 192/70.12 |

FOREIGN PATENT DOCUMENTS

DE    12 21 503    7/1966

* cited by examiner

*Primary Examiner*—Saul Rodriguez
(74) *Attorney, Agent, or Firm*—Cohen Pontani Liberman & Pavane LLP

(57) ABSTRACT

A clutch arrangement for a motor vehicle has a clutch housing that is filled with pumped medium in the form of fluid, a first friction element being rotatable in common with the clutch housing. Further, a second friction element is provided which is rotatable in common with a driven member and which can be brought into an operative connection with the at least one first friction element for producing a frictional interaction. At least one first friction element and at least one second friction element are each provided with a support component that can be provided for receiving at least one friction lining. The support components have support component segments which are arranged successively in circumferential direction and which are provided at a circumference-side terminating edge, respectively, with fluid delivery surfaces for generating a fluid circulation and are constructed in the form of friction lining segments to produce the frictional interaction with friction linings. The fluid delivery surfaces adjoin a cutout of the support component in each instance.

30 Claims, 13 Drawing Sheets

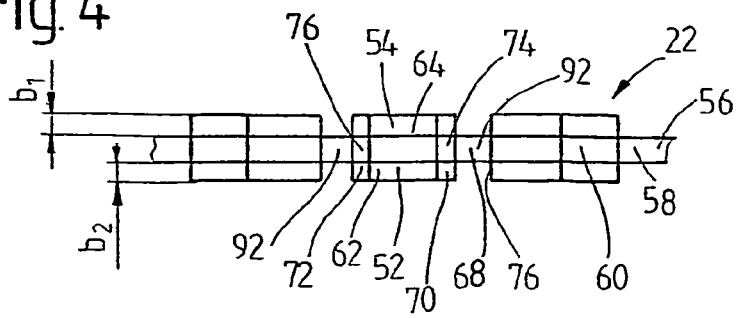
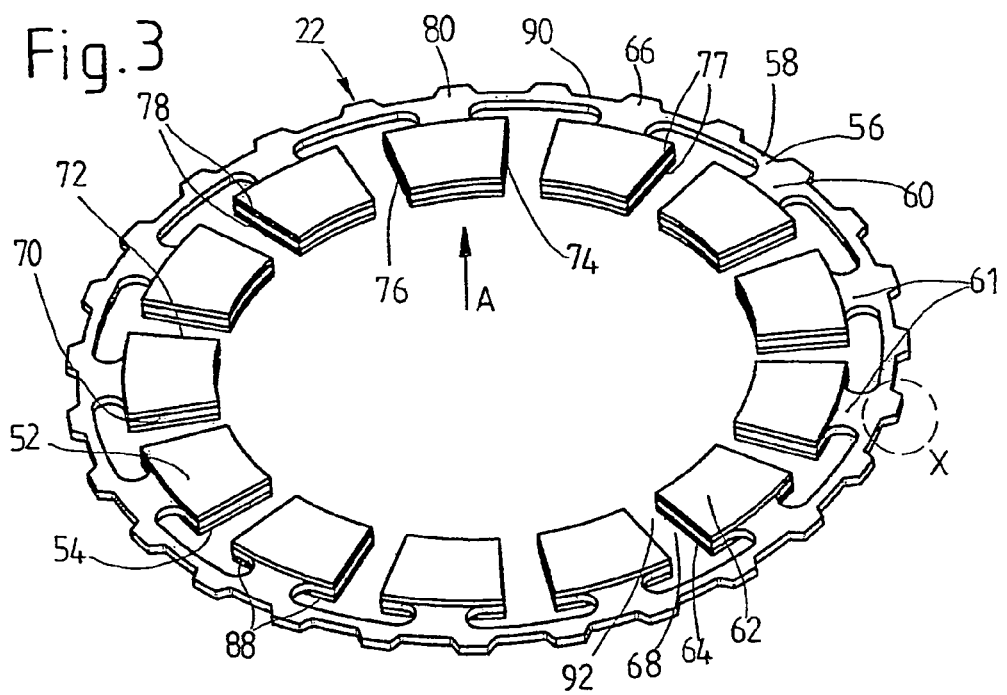
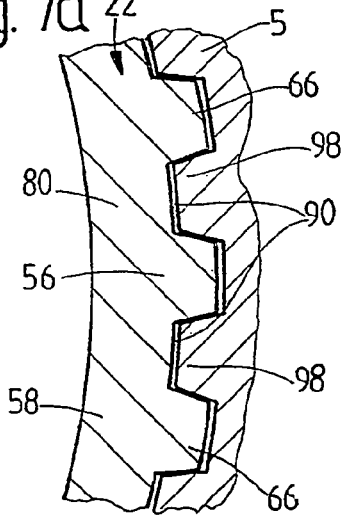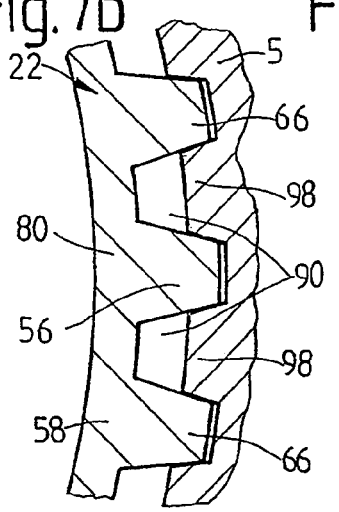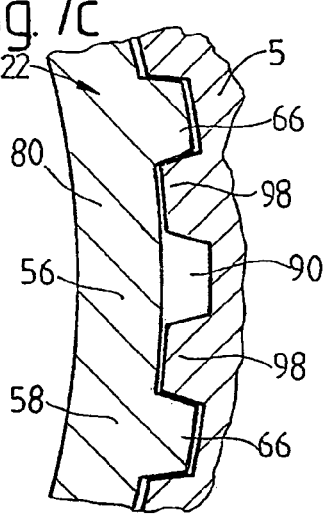

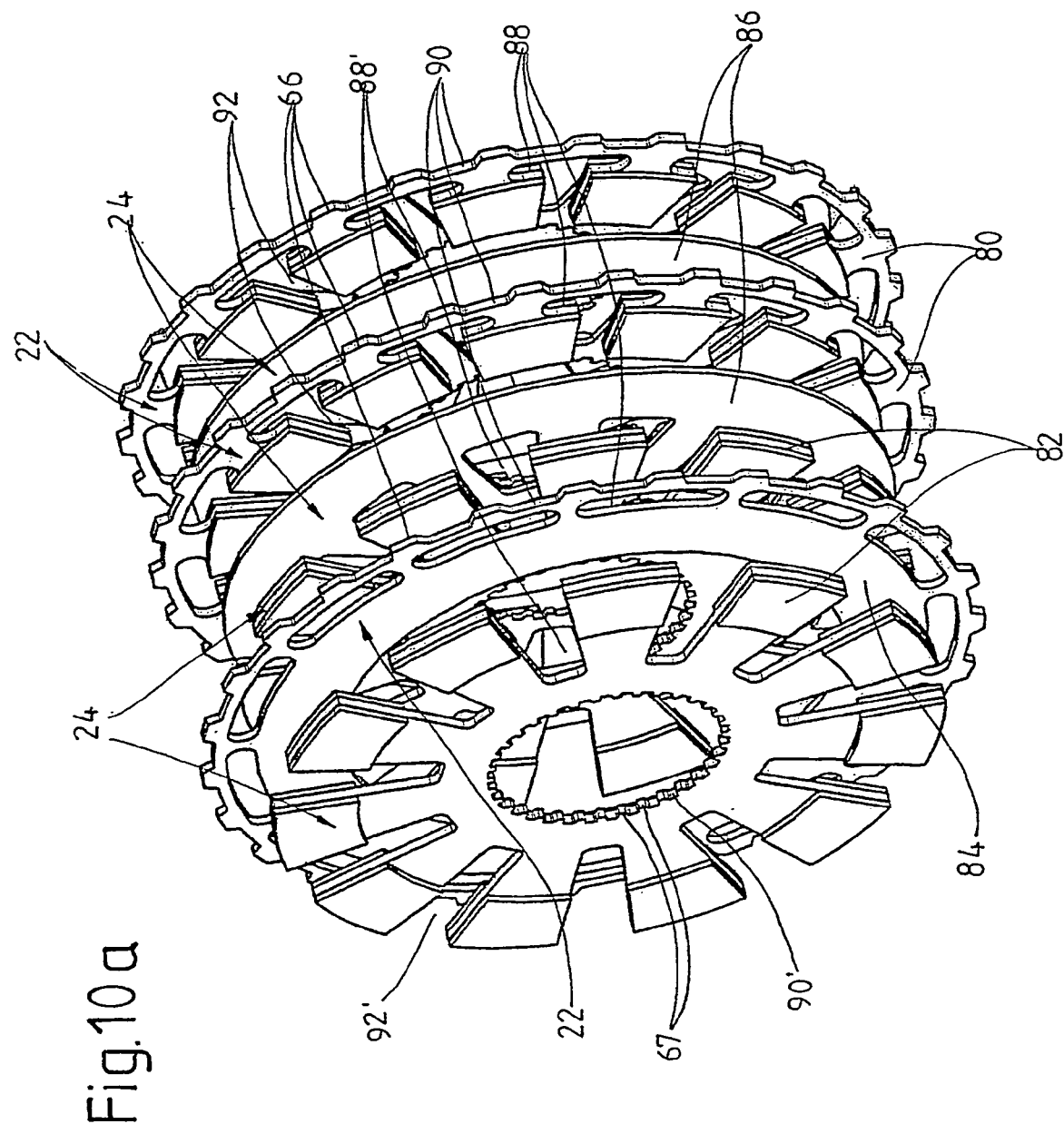

CLUTCH ARRANGEMENT

PRIORITY CLAIM

This is a U.S. national stage of application No. PCT/EP03/07223, filed on 5 Jul. 2003. Priority under 35 U.S.C. §119(a) and 35 U.S.C. §365(b) is claimed from German Application No. 102 34 822.7, filed 31 Jul. 2002.

BACKGROUND OF THE INVENTION

1. Field of the Invention

The present invention is directed to a clutch arrangement including a clutch housing filled with a pumped fluid, the clutch housing being rotatable about an axis of rotation; at least one first friction element which is fixed against rotation with respect to the housing; and at least one second friction element which is fixed against rotation with respect to a driven member which is rotatable about the axis of rotation, the at least one second friction element being frictionally engageable to rotate in common with the at least one first friction element.

2. Description of the Related Art

U.S. Pat. No. 6,394,243 discloses a clutch arrangement, which is known in technical circles as a wet clutch, comprising a plurality of friction elements, generally referred to as disks, which can be brought into frictional interaction with one another. These disks can be pressed against one another by a clutch piston so that a torque transmission generated by coulomb friction is achieved between the clutch housing and a driven element. Particularly in slip operation, for example, when starting, at least some of the drive torque of the drive unit is converted to heat by the friction elements rubbing against one another. Above all, in slip states lasting over longer periods of time, e.g., when driving uphill, this can result in overheating in the area of the friction elements and possibly in damage to their friction linings. In order to provide for cooling, a fluid flow arrangement is provided by which fluid, as delivered or pumped medium, can be introduced, e.g., by a fluid delivery pump provided in a transmission arrangement, into the clutch housing and also removed from the latter. The pumped medium flows along the friction elements, absorbs heat and transports this heat out of the area of the clutch arrangement. The pumped medium that is heated when flowing through the clutch arrangement can be cooled in a transmission cooling device. The flow of fluid built up in this way is comparatively slow and, as a result, a small amount of fluid, e.g., 10 l/m, flows around the various friction elements. At very high loads, the required removal of heat can often not be achieved in spite of this circulation.

SUMMARY OF THE INVENTION

It is the object of the present invention to provide a clutch arrangement for a motor vehichle in which the risk of at least local overheating is extensively eliminated even with high loading of the friction elements, while nevertheless affording a simple construction of the friction elements.

According to the invention, this object is met by a clutch arrangement for a motor vehicle comprising a clutch housing that is filled with pumped medium in the form of fluid, at least one first friction element which is rotatable in common with the clutch housing, and at least one second friction element which is rotatable in common with a driven element and which can be brought into contact with at least one first friction element for producing a frictional interaction.

Further, at least one friction element is provided for generating a fluid circulation flowing around the friction elements at least partially.

Due to the fact that a fluid circulation flowing around the friction elements in the clutch arrangement according to the invention is caused by the friction elements themselves, the pumped medium present in the clutch housing flows along the friction elements repeatedly before being exchanged within the bounds of the fluid circulation generally and therefore, because of the existing heat storage capacity of the pumped medium, an appreciably greater amount of heat can be carried away with this pumped medium than would be possible if it flowed along the friction elements only once. This arrangement is particularly advantageous in case of temporary high loading which leads to increased temperature of the pumped medium. Within the framework of the fluid exchange generally, this pumped medium which is brought to an appreciably higher temperature is removed from the clutch housing and brought back to normal temperature in a transmission cooling device or other cooling arrangement. The fluid circulation, according to the invention, which is induced by the friction elements themselves, causes a flow in which a large amount of fluid, e.g., 3000 l/min, flows around the friction elements or at least portions thereof.

A step by which a very high fluid delivery efficiency can be provided consists in that at least one first friction element and at least one second friction element are constructed for generating the fluid circulation. At least one first friction element and at least one second friction element can preferably have at least one fluid delivery surface. Within the meaning of the present invention, a fluid delivery surface is a surface which acts upon the pumped medium to be set into circulation in order to set this pumped medium in motion, that is, for example, to impart to the pumped medium a flow velocity in circumferential direction and, accordingly, to provide that this pumped medium moves radially outward due to centrifugal force. A fluid delivery surface is also a surface which, e.g., in the manner of an turbine wheel, provides for momental support of a fluid that is set in circulation and, therefore, particularly also due to the difference in the rotational speed between two fluid delivery surfaces, ultimately contributes to the delivery of the pumped medium and to the generation of the fluid circulation inducing the cooling action according to the invention. Another highly significant aspect of the present invention consists in that not only can heat be carried away from the area of the thermally loaded surfaces in an improved manner by the fluid circulation that is built up, but, as a result of momental support, this fluid circulation can also contribute to the transmission of torque in the manner of a pump/turbine arrangement so that the first friction element can act as a pump element and the second friction element can act as an turbine element. This means that the torque transmission capacity can be increased in a clutch arrangement of this type. Further, this torque transmission generated by fluid circulation is already active in a state in which the surface areas that can be brought into frictional interaction with one another are not yet in contact.

In order to provide the best possible fluid delivery efficiency, the at least one fluid delivery surface can be constructed with a radial extension component and an axial extension component according to the present invention.

For example, the at least one fluid delivery surface can be constructed at least partially with a surface normal oriented substantially tangentially.

In a particularly simple embodiment form according to the invention, the fluid delivery efficiency can be increased in that the at least one first friction element and/or the at least one second friction element have/has a friction lining on at least one axial side of the at least one fluid delivery surface. The fluid delivery efficiency can be increased even further in that the at least one first friction element and/or the at least one second friction element has, at both axial sides, friction linings which provide fluid delivery surfaces.

High fluid delivery efficiency is provided in that the at least one first friction element and/or the at least one second friction element have/has a supporting structural component part, or support component, which preferably carries a friction lining, particularly in the form of a friction lining segment, on at least one axial side, and in that at least one fluid delivery surface is provided by the support component. This can be achieved, for example, in that the support component has support component segments that are formed successively in circumferential direction without an axial offset with respect to one another and are separated from one another in circumferential direction by cutouts of the support component in order in this way to provide the at least one fluid delivery surface by means of a circumference-side terminating edge of the support component segment. In this way, a plurality of successive fluid delivery surfaces in circumferential direction is provided at the at least one first friction element and/or the at least one second friction element, resulting in a very high fluid delivery efficiency. In order to keep the design as simple as possible in spite of this, it is suggested that cutouts are formed at the support component by removing material from within a substantially ring-shaped plate-metal blank.

Since, as was already mentioned, a cutout is located between every two support component segments in circumferential direction, the quantity of support component segments and, therefore, the quantity of fluid delivery surfaces can be determined in a very simple manner by determining the quantity of cutouts per support component. Therefore, no problem is presented in providing the support component of the first friction element with a different quantity of support component segments than the support component of the second friction element. In both cases, an odd number of support component segments is preferable to an even number of support component segments. In this way, excitation of vibrations between the two friction elements can be prevented assuming an even number of support component segments. Under unfavorable conditions, such vibrations can not only reinforce the excitation of vibrations of an internal combustion piston engine and therefore cause humming noise in the drivetrain, but could even result in damage in the area of the drivetrain. In order to prevent problems of this kind, the quantity of fluid delivery surfaces responsible for the fluid circulation between the first friction element and second friction element is selected in such a way that a factor of 2 can not be a common divisor. For this reason, prime numbers are preferably used as amounts, specifically different amounts in the first friction element and second friction element.

As was already mentioned, when the support component segments are provided with friction linings, these friction linings have, beyond their actual function, the additional function of enlarging the fluid delivery surfaces. Particularly in friction linings whose lining segment terminations on the circumferential side are formed flush with the terminating edges of the support component segments, a common surface is formed which acts on the pumped medium penetrating into the cutouts of the support component. This pumped medium is conveyed in radial direction relative to the clutch housing due to the movement of the fluid delivery surfaces, that is, preferably within a flow channel remaining between two fluid delivery surfaces. Analyses have shown that the material cross sections of the friction lining segments in relation to the material cross sections of the support component segments can have a considerable influence on the flow between the first friction element and the second friction element. For example, a support component with a small material cross section combined with friction lining segments having a comparatively large material cross section is advantageous because the thick friction linings permit a deep flow channel toward the radial outer side, which makes it possible for the radially flowing fluid to pass without difficulty into the area of an axially adjacent structural component part, e.g., an intermediate disk without lining or another friction element. Due to its comparatively great distance from the axially adjacent structural component part, pumped medium exiting from a deeper flow channel produces a less pronounced impact than pumped medium having hardly any distance available for deflection in axial direction due to a very flat flow channel. Further, the pumped medium would be decelerated to a greater extent when impacting on a radial edge of the adjacent structural component part on the circumference side when the material cross section of this structural component part is increased. Accordingly, support components which are narrower in axial direction and friction linings that are wider reduce impulse forces directed in axial and circumferential direction between the friction elements, which ultimately could lead to unwanted vibrations.

The support components are preferably plate-shaped and are rotatably connected in a positive engagement, but so as to be axially displaceable, either with the clutch housing or with a driven element, e.g., by means of coupling projections forming part of a toothing. When the toothing at one of the support components is formed as an external toothing, the support component segments extends radially inward so that a first friction element is formed in the manner of a pump disk with respect to function. Conversely, when a support component is constructed with a toothing as an internal toothing and with support component segments extending radially outward, a second friction element is realized in the manner of a turbine disk. Due to its construction, the pump disk causes the fluid to be conveyed from the radial inner side to the radial outer side, while the turbine disk causes the fluid to be conveyed in the opposite direction. As was already mentioned, an intermediate disk can be provided axially between the pump disk and turbine disk. However, it is compulsory that this intermediate disk allow an axial flow to pass in order to maintain the desired flow field, for example, in that it is constructed with axial passages for the flow. Of course, the pump disk and turbine disk should also be formed with passages of this kind. With regard to the intermediate disks, these passages can be provided in the area of one of the inner toothings or outer toothings which are present in any case, namely, for example, by radial enlargement of the intermediate spaces between the coupling projections and the respective associated counter-coupling projections. However, it is also conceivable to provide additional through-openings in the radial extension area of the respective carrier ring. Of course, by enlarging these passages and/or through-openings, the pumped medium can be guided through the clutch arrangement in axial direction with fewer impulses caused by impact than would be the case with smaller passages and/or through-openings. Therefore, as set forth in the claims, at least one through-opening formed in the carrier ring of the intermediate disk is preferably associated with at least some of the passages to enlarge the respective flow cross section. Comparable passages and through-openings are preferably also provided in the support components of the first friction element and/or second friction element.

Touching again on the matter of fluid delivery surfaces of the first friction element or second friction element, the latter can have a considerable effect on the behavior of the pumped medium flow based on different geometric constructions. When the fluid delivery surface is curved opposite to the rotating direction, for example, the hydrodynamic proportion of the volume flow can be reduced in the total effect, whereas this proportion is increased when a fluid delivery surface is curved in the rotating direction. In the latter case, a creep behavior can be achieved, although with diminished ability to regulate the clutch arrangement, whereas a reduced hydrodynamic proportion improves the ability to regulate the clutch arrangement but no longer allows a creep behavior to be determined.

The fluid delivery surfaces can likewise be constructed so as to slope in axial direction, so that secondary flow effects and the flow course can be influenced directly at the counter-friction surface.

The quantity of cutouts in the support components not only determines the quantity of fluid delivery surfaces but also the quantity of friction lining segments. This provides an advantageous possibility for fine adjustment of the effective surface-area pressing for transmitting a predetermined torque. As friction lining material for the friction lining segments, paper of a certain thickness may be too susceptible to the forces resulting in particular from shear forces and torsional moments due to the elasticity of the support component and may also be unsuitable for reasons of cost. Therefore, it can be useful that the friction lining segments are made of composite material such as carbon fiber material.

An increase in the proportion of friction lining segments at the support component always entails a reduction in the flow volume for the pumped medium made available by the flow channels. Because of this situation, the first friction element and the second friction element afford the possibility that they can be optimally adapted to the respective requirements for torque transmitting capability on the one hand and cooling action on the other hand.

BRIEF DESCRIPTION OF THE DRAWINGS

FIG. 3 shows a first friction element which is used in the clutch arrangement according to FIG. 2 and which acts as a turbine disk;

FIG. 4 is a view of the friction element from viewing direction A in FIG. 3;

FIG. 7a shows an enlarged detail of passages for pumped fluid at the friction element according to FIG. 3 or FIG. 6;

FIG. 7b shows the same view as FIG. 7a, but with radially deepened passages;

FIG. 7c shows the same view as FIG. 7a, but without a coupling projection for enlarging the passage;

FIG. 10a shows an axial section from the clutch arrangement according to FIG. 2;

DETAILED DESCRIPTION OF THE PRESENTLY PREFERRED EMBODIMENTS

Figure 1:
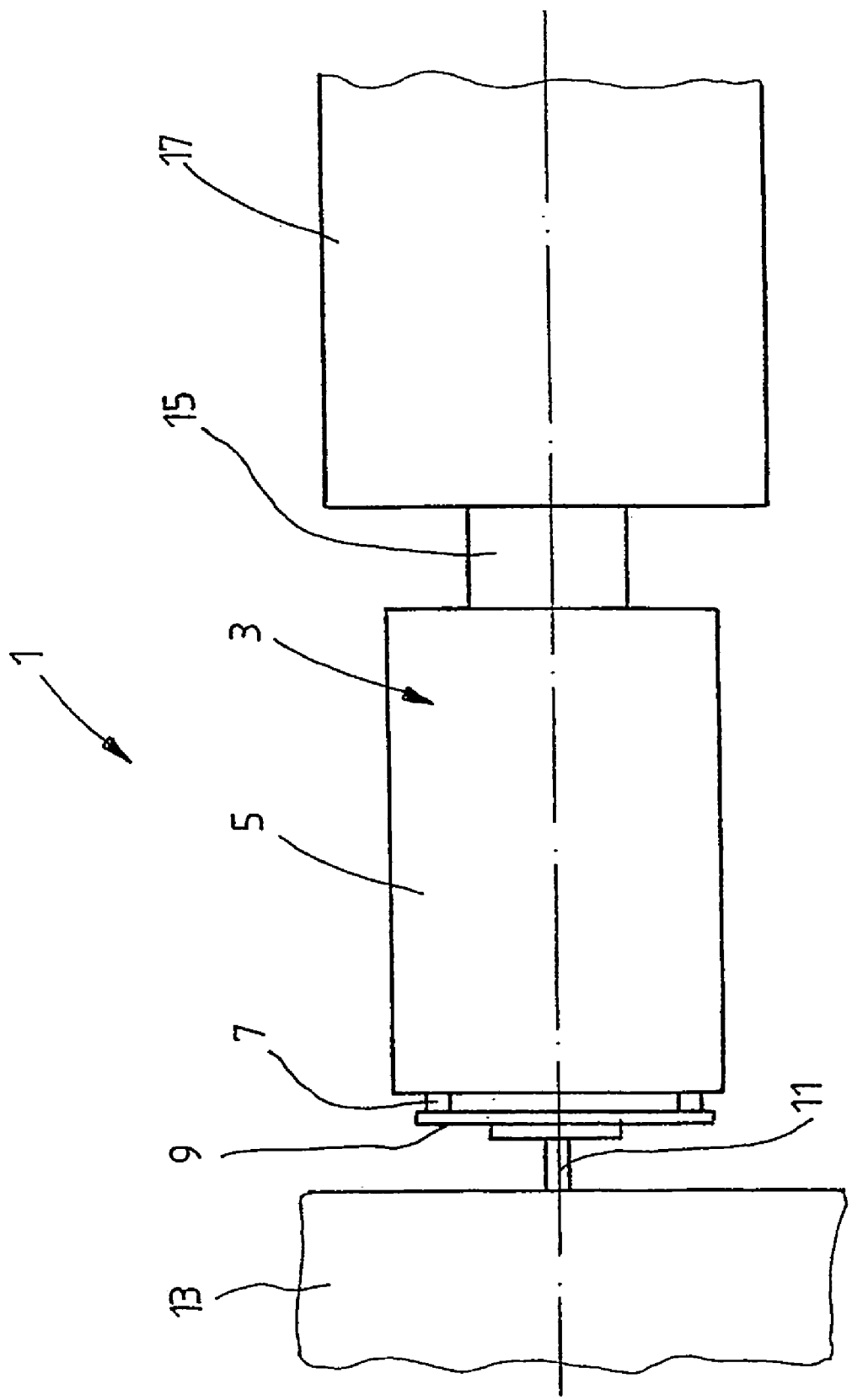
FIG. 1 shows a basic diagram of a drivetrain with a drive member, a clutch arrangement and a transmission arrangement.

A drivetrain 1 with a clutch arrangement 3, according to the invention, is shown schematically in FIG. 1. The clutch arrangement 3 comprises a clutch housing 5 which can be coupled by a plurality of fastening members 7 and a coupling member 9, e.g., a flex plate, with a drive shaft 11, e.g., the crankshaft of an internal combustion engine 13, so as to rotate in common with it. At its axial side remote of the drive shaft 11, the clutch housing 5 has a housing hub 15 which engages, for example, in a transmission arrangement 17 and there drives a fluid delivery pump, not shown, in rotation. A driven shaft 18, shown in FIG. 2, which projects with its free end into the interior 20 of the clutch housing 5 is arranged concentric to the housing hub 15. This driven shaft 18 can be a transmission input shaft, for example.

A plurality of first friction elements 22 which are coupled with the clutch housing 5 so as to rotate in common with it and a plurality of second friction elements 24 which are coupled by a connection element 26 and a driven hub 28 with the driven shaft 18 so as to rotate in common with it are provided in the clutch housing 5. The connection element 26 and the driven hub 28, as well as the driven shaft 18, can be part of a driven member. An abutment element 30 is provided at the connection element 26 so as to be fixed with respect to rotation relative to it and is fixed at least in one axial direction by a retaining ring 31. The first friction elements 22 and the second friction elements 24 lie between this abutment element 30 and a clutch piston 32. The clutch piston 32 divides the interior space 20 of the clutch housing 5 into a first spatial area 34 containing the friction elements 22, 24 and a second spatial area 36 into which pumped medium can be introduced via a central opening 38 provided in the driven shaft 18. In order to seal the second spatial area 36 with respect to the first spatial area 34, the substantially ring-shaped clutch piston 32 is received on the radial outer side and radial inner side on respective bearing elements 40, 42 with the intermediary of sealing elements so as to be tight against fluid but axially displaceable. A plurality of fluid flow channels 44 which allow pumped medium to be supplied to the second spatial area 36 are provided in the radial inner bearing element 42.

Pumped medium can also be introduced into or removed from the first spatial area 34. For this purpose, a hollow-cylindrical separating element 46 is provided, for example, in the spatial area formed between the driven shaft 18 and the housing hub 15. This hollow-cylindrical separating element 46 forms a flow space 48 between the housing hub 15 and itself and, further, a flow space area 50 between the driven shaft 18 and itself. Work fluid can be introduced by the fluid delivery pump provided in the transmission arrangement through the flow space area 48 into the spatial area 34 in which it flows radially outward. The pumped medium flows around the friction elements 22, 24 substantially axially, then passes radially inward and is removed again via the flow space area 50. In this way, the pumped medium which is heated in the clutch housing 5, as will be described in the following, can be continually exchanged and replaced by cooler pumped medium.

At least some of the first friction elements 22 and some of the second friction elements 24 carry friction linings 52, 52', 54, 54' at both axial sides. Another friction element 22, 24, respectively, is located axially across from these friction linings 52, 52', 54, 54' for frictional interaction. The different friction elements 22, 24 engage in the manner of an axial toothing at the clutch housing 5 and at the connection element 26, respectively, so as to be fixed with respect to rotation relative thereto and so as to be displaceable axially in the direction of the axis of rotation 55. The construction of a friction member of this kind which is provided with friction linings 52, 52', 54, 54' will be described in the following with reference to a first friction element 22 in FIGS. 3 and 4. The basic construction of the second friction elements 24 provided with friction linings 52, 52', 54, 54' will then be discussed with reference to FIGS. 5 and 8.

FIG. 3 shows that the first friction element 22 is constructed with a support component 56 having a carrier ring 58 and support component segments 60 proceeding substantially radially from the carrier ring 58. When considered from the radial inner side in viewing direction A, it will be seen in FIG. 4 that the support component 56 is planar and the support component segments 60 are provided as lining-supporting portions which carry friction lining segments 62 and 64, respectively, of the friction linings 52, 54 at their axial sides remote from one another. Of course, these friction linings 52, 54 can also have different material cross sections b1, b2. Coupling projections 66 in the form of a toothing are provided at the carrier ring 58 at its radial side remote of the support component segments 60. As is shown in detail in FIG. 7a, the rotationally-fixed connection with corresponding counter-coupling projections 98 of the clutch housing 5 is carried out by means of these coupling projections 66.

It can further be seen in FIGS. 3 and 4 that the successive support component segments 60 in circumferential direction are separated from one another by cutouts 68. These cutouts 68 extend radially inward proceeding from the carrier ring 58 and are defined in circumferential direction by the circumferential edges 70, 72 of the adjacent support component segments 60. For example, the respective circumferential edges 70, 72 can be constructed with surface normals extending tangential to the circumferential circle and form fluid delivery surfaces 74, 76 which are enlarged axially by the friction lining segments 62, 64, in particular, when the circumferential edges 77, 78 of the friction lining segments 62, 64 are positioned flush with the circumferential edges 70, 72 of the support component segments 60. The fluid delivery surfaces 74, 76 of the first friction elements 22 which are coupled with the clutch housing 5 so as to rotate in common with it act as pump blade surfaces, e.g., in an engagement member in which the first friction elements 22 have an appreciably higher rotational speed than the second friction elements 24, and ensure in their function as pump disk 80 that a fluid flow that is guided radially outward is generated in their area. The fluid delivery surfaces 74', 76' (FIG. 5 or FIG. 8) provided at the second friction elements 24 in a corresponding manner act in the same way as turbine blade surfaces realized in a turbine disk 82 which serve as momental support for the pumped medium that is set in movement by the fluid delivery surfaces 74, 76 of the first friction elements 22 because of the difference in rotating speed between the first friction elements 22 and the second friction elements 24 and, in so doing, guide this pumped medium radially inward. Accordingly, this pumped medium which is conducted radially inward by means of the fluid delivery surfaces 74', 76' of the second friction elements 24 replaces the pumped medium that is conveyed from the radial inside to the radial outside by the fluid delivery surfaces 74, 76 of the first friction elements 22. Accordingly, as is shown by dashed arrows in FIG. 2, a fluid circulation is built up that corresponds to the fluid circulation generated by a pump wheel and a turbine wheel of a hydro dynamic torque converter or a fluid clutch.

Independent from the above-mentioned exchange of the pumped medium present in the clutch housing 5 which can take place at a rate of 10 l/min, for example, the fluid circulation generated in the clutch arrangement 3 according to the invention causes a permanent fluid circulation and flow around the friction elements 22, 24 which can generate a flow of, e.g., 3000 l/min around these friction elements 22, 24. In this way, the friction heat generated in friction operation or slip operation in the different friction elements 22, 24 can be absorbed in the pumped medium appreciably better, above all during starting processes in which these friction elements are subjected to high loads. The comparatively slow fluid exchange is superimposed on this fluid circulation so that the fluid which is continually brought to a comparatively high temperature by the circulation is partially removed and replaced by cooler fluid.

Figure 2:
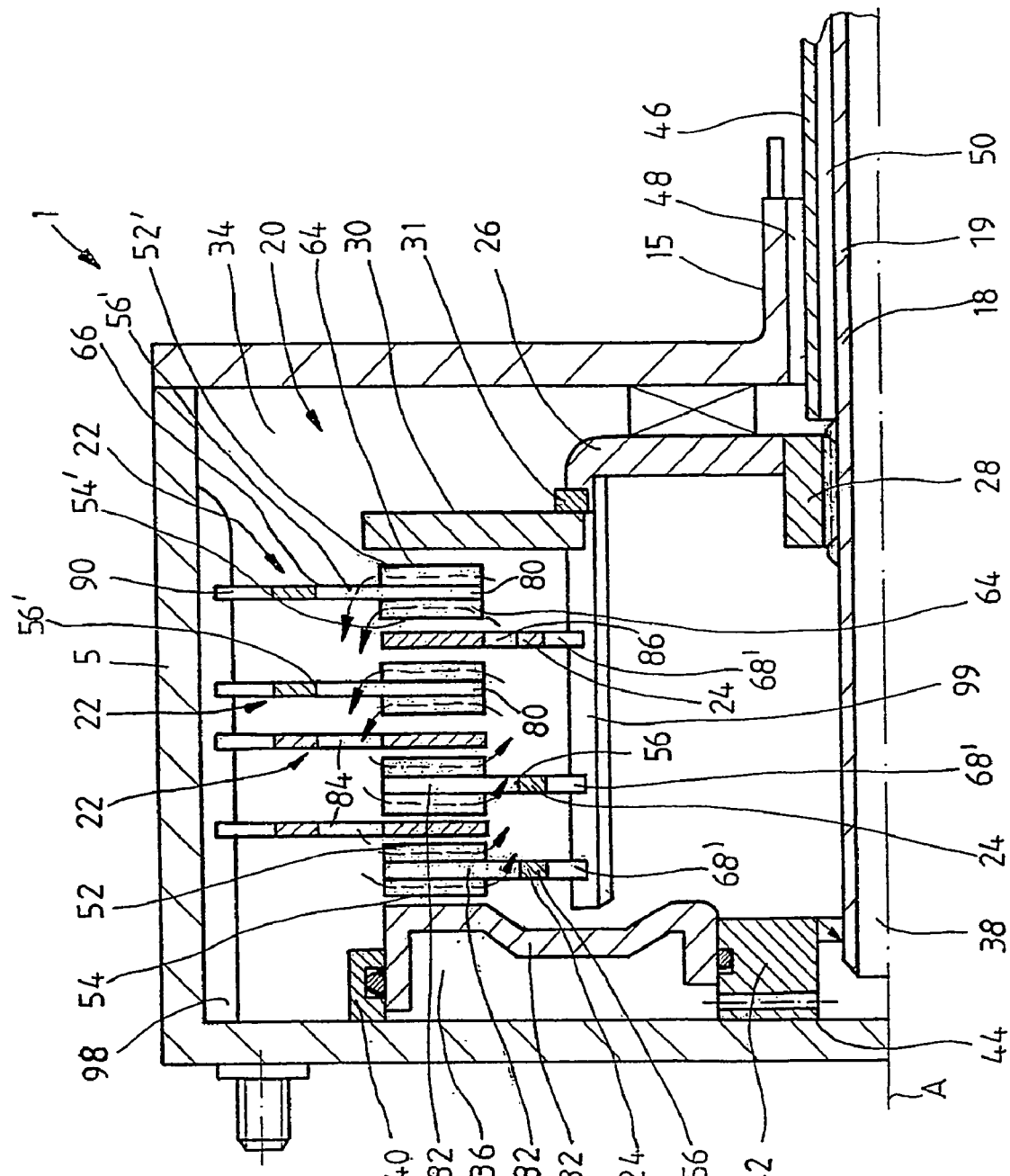
FIG. 2 is a longitudinal sectional view through the clutch arrangement.

Of course, the principle of generating a fluid circulation shown in FIG. 2 can be provided regardless of the quantity of first friction elements or second friction elements. Further, in this connection, circuit variants are shown in U.S. Pat. No. 6,394.243, which is incorporated by reference in the present patent application.

Figure 9A:
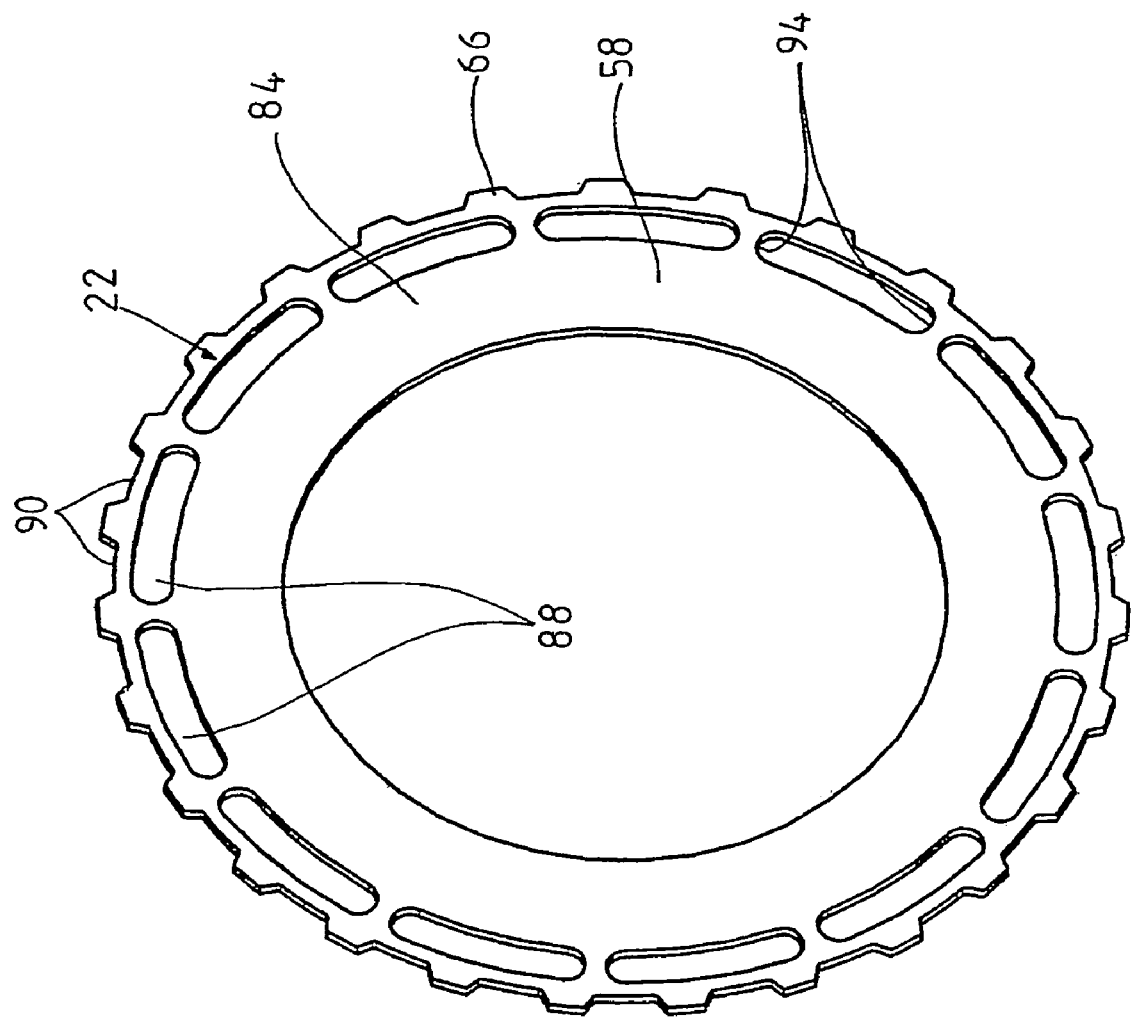
FIG. 9a shows a first friction element without friction linings acting as an intermediate disk.

Returning to the construction shown in FIG. 2, the friction elements 22, 24 provided therein are shown in an enlarged detail in FIG. 10a so as to be spaced apart axially. The first friction elements 22 formed for conveying fluid are arranged in succession and receive axially therebetween a substantially plate-shaped second friction element 24 in the form of an intermediate disk 86 without a lining, shown as a detail in FIG. 9b. Following a friction element 22, shown in FIG. 9a, which acts as an intermediate disk 84 without lining are the second friction elements 24 which are constructed for conveying fluid and between which there is again an intermediate disk 86 without lining as first friction element 22. A global fluid circulation is generated with respect to the totality of friction elements 22, 24. A plurality of local fluid circulation areas can be generated in the area of the friction elements 22, 24 in that first friction elements 22 contributing to the generation of the fluid flow and second friction elements 24 contributing to the generation of the fluid flow are arranged in a staggered manner. It is also not compulsory that first friction elements 22 and second friction elements 24 constructed for generating fluid be provided in identical quantity. For example, more friction elements 22 acting as pump disks 80 can be provided and/or more friction elements 24 acting as turbine disks 82 can be provided.

In the construction of the first friction element 22 shown in FIG. 3, the coupling projections 66 which are used for rotational coupling and which lie at an offset relative to one another are displaced relatively far outward radially relative to the support component segments 60 so that a through-opening 88 for a substantially unimpeded circulation of fluid in axial direction can be provided in circumferential direction between every two connections 61 of the support component segments 60 at the carrier ring 58. Passages 90, shown in FIG. 7a, which are provided at the radial outer side of the carrier ring 58 are associated with these through-openings 88. For an even stronger flow of pumped medium, the passages 90 according to FIG. 7b can be constructed so as to be larger in radial direction than is required for the rotational connection to the counter-coupling projections 98 of the clutch housing 5. It is likewise conceivable, according to FIG. 7c, to dispense with some of the coupling projections 66 so as to obtain additional large-volume passages 90.

The embodiment forms according to FIGS. 7a to 7c can likewise be applied in the second friction elements 24 coupled with the driven shaft 18. The different through-openings 88' and passages 90' then extend radially inward with respect to the support component segments 60' supporting the friction lining segments 62', 64'. In this respect, reference is had to FIGS. 5 and 9b, in which the passages 90' are defined in circumferential direction by two coupling projections 67 each which, according to FIG. 2, are connected to the connection element 23 by counter-coupling projections 99 so as to be fixed with respect to rotation relative to the latter but so as to be axially displaceable. In contrast, in the turbine disk 82 according to FIG. 5 as well as in the intermediate disk 86 according to FIG. 9b, the through-openings 88' extend farther inward radially than the radial inner side of the friction area designated for torque transmission. In this regard, FIG. 5 shows support component segments 60' which are guided farther inward radially in relation to the friction lining segments 62', 64' and are provided at a carrier ring 58' of the support component 56', which carrier ring 58' is very small radially.

Figure 5:
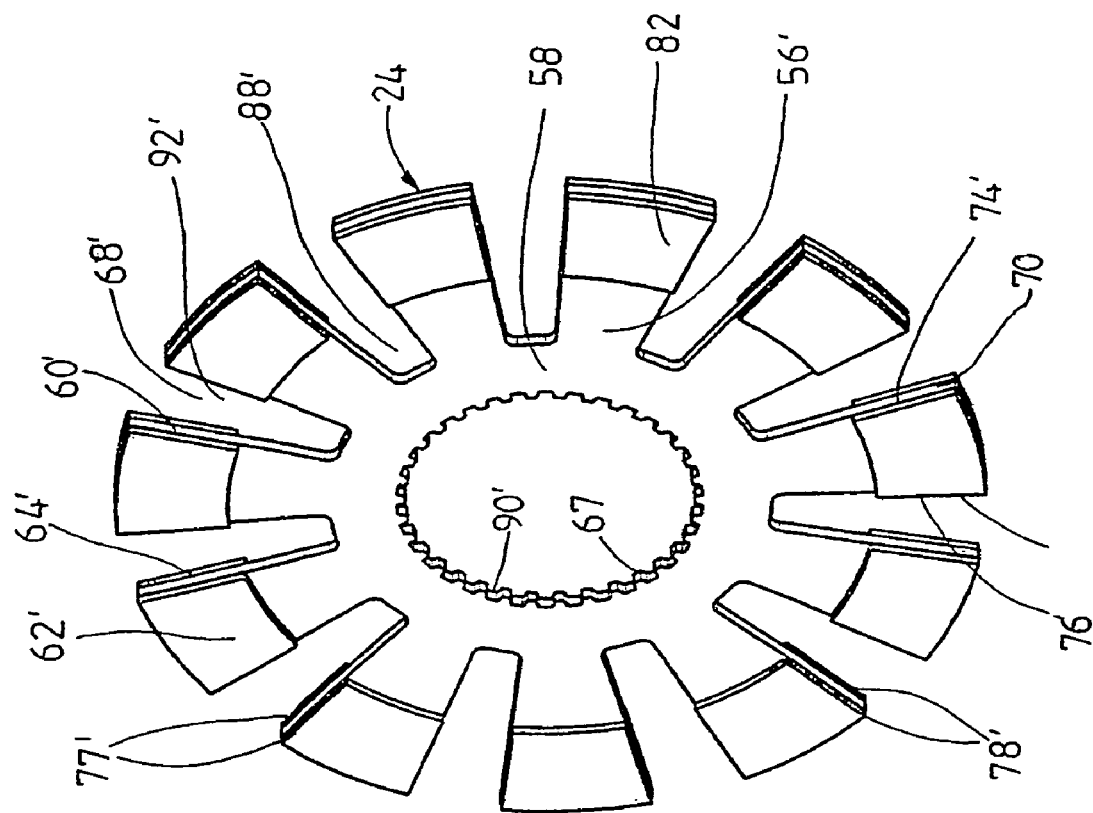
FIG. 5 shows a second friction element that is used in the clutch arrangement according to FIG. 2 and acts as a turbine disk.
Figure 8:
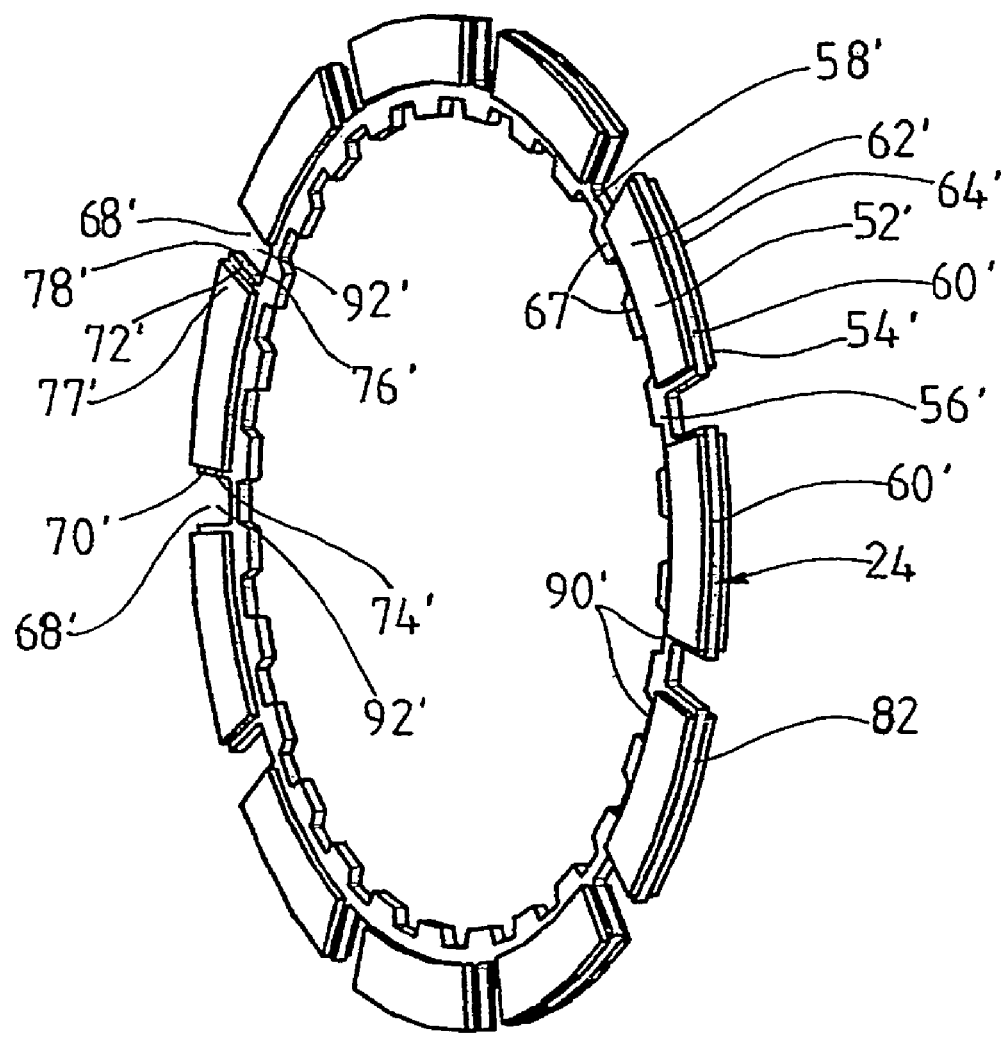
FIG. 8 shows a modification of the friction element shown in FIG. 5.

In other respects the construction of the second friction element 24 shown in FIG. 5 and the construction according to FIG. 8 both have friction lining segments 62', 64' at the carrier ring 58' at its radially outwardly projecting support component segments 60' at both axial sides thereof. Considered in circumferential direction, the circumference-side terminating edges 77', 78' of the friction lining segments 62', 64' terminate flush with the circumference-side terminating edges 70', 72' of the support component segments 60', so that the desired fluid delivery surfaces 74', 76' also result again in this case and, viewed in circumferential direction, define a cutout 68' between them.

In the engaged state of the clutch arrangement 3, the cutouts 68, 68' of the pump disk and turbine disk are defined axially by the two intermediate disks 84, 86. In this way, in a pump disk 80, flow channels 92 are formed which are closed on the radial outer side by the carrier ring 58 but are open on the radial inner side and therefore also defined by the radial outer ends of the fluid delivery surfaces 74, 76 in a flush manner on the radial outer side. In the turbine disks 82, on the other hand, flow channels 92' are formed which are closed on the radial inner side by the carrier ring 58' and which open toward the radial outside. These flow channels 92' are in turn defined on the radial inner side by the radial inner ends of the fluid delivery surfaces 74', 76'.

Figure 9B:
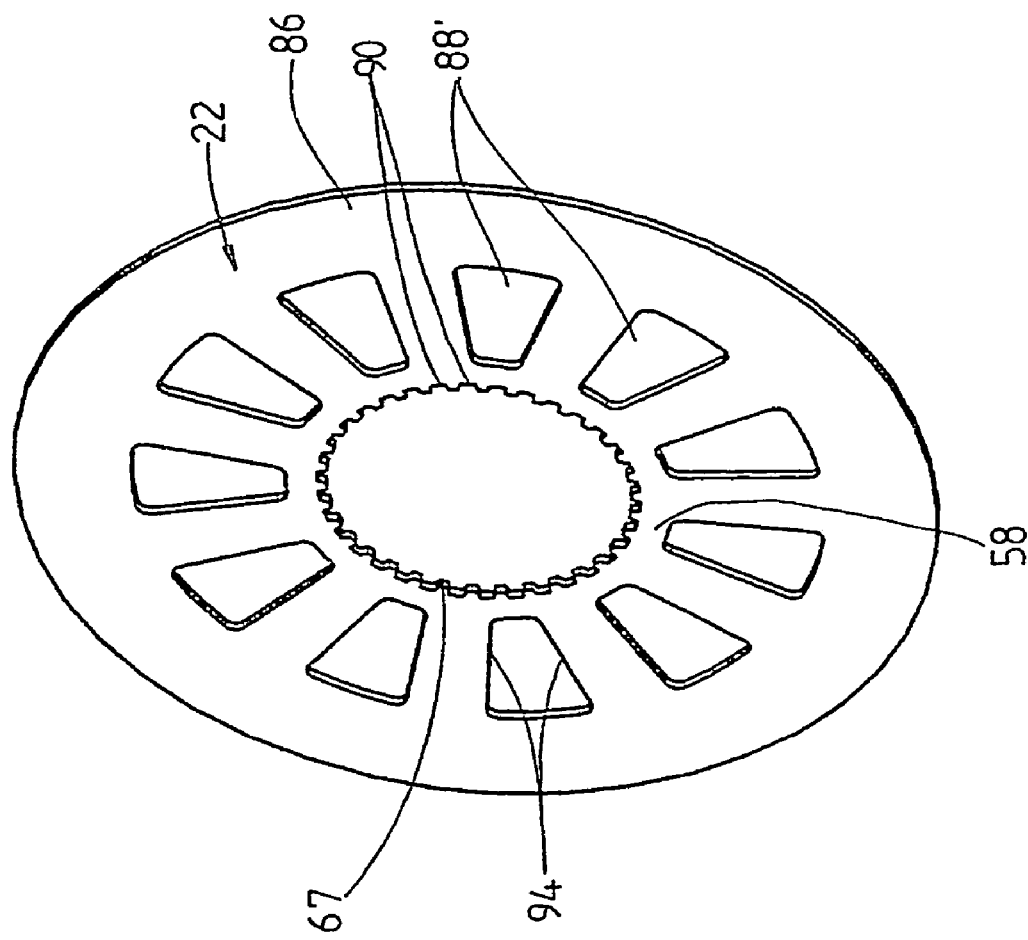
FIG. 9b shows a second friction element without friction linings acting as an intermediate disk.
Figure 11:
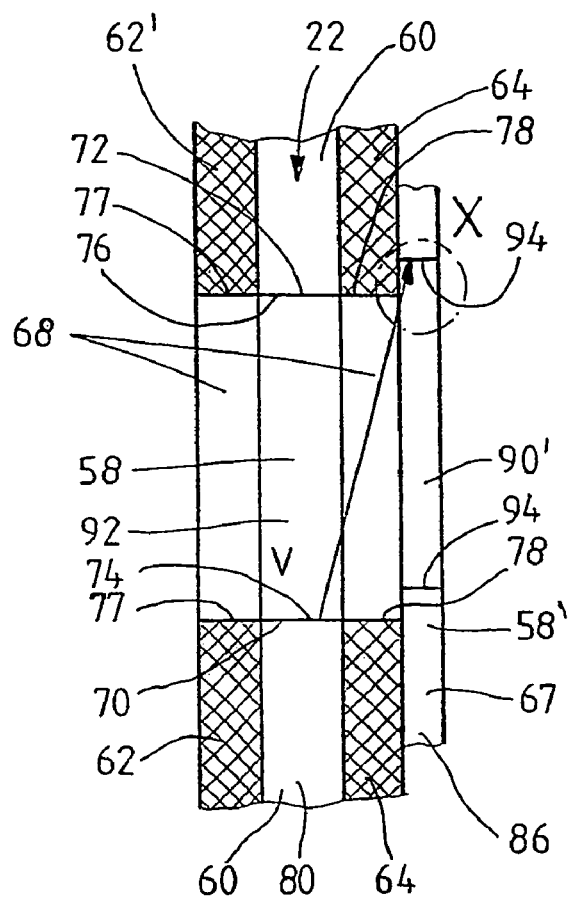
FIG. 11 schematically shows pumped medium passing between two friction elements, one of which has a fluid delivery surface and the other a flow face.

The flow path of the pumped medium in the transition from the pump disk 80 to the intermediate disks 86 is shown schematically in FIG. 11. The pumped medium flowing through the flow channels 92 and accelerated by one of the fluid delivery surfaces 74 of the pump disk 80 strikes the associated circumference-side terminating edge 94 of a passage 90' or of a through-opening 88' of the intermediate disk 86 and accordingly causes an impulse in circumferential direction. Since a portion of the pumped medium will also impinge axially on the carrier ring 58' of the intermediate disk 86 or on a coupling projection 67 adjacent to the passage 90', an impulse can also result in axial direction. These portions of the pumped medium make the through-flow properties worse, while impulses which are caused by the impact of the pumped medium in circumferential direction can lead to nonuniformity in the delivery direction. This last problem can be minimized in that the intermediate disk 86 is constructed with a comparatively small material cross section so that the pumped medium encounters only a limited deflecting surface at the circumference-side terminating edge 94. In order to reduce the impulses in axial direction it is helpful to increase the flow cross sections in axial direction, for example, by enlarging the passage 90' through at least one additional through-opening 88' that can be formed in the carrier ring 58' of the intermediate disk 86 as is shown in FIG. 9b. Alternatively, it is also possible to omit the above-mentioned passages 90' and to rely only on comparatively large through-openings 88' inside the carrier ring 58'. Comparable conditions are met with in an intermediate disk 84 which acts as a first friction element 22 and is shown in detail, for example, in FIG. 9a. Of course, in the intermediate disk 84, the through-openings 88 are arranged in the radial outer area of the carrier ring 58 radially inside the coupling projections 66, while in intermediate disk 86 the through-openings 88' are provided in the radial inner area of the carrier ring 58', namely, radially outside of the coupling projections 67. It is possible to combine intermediate disks 84, 86, which are formed with through-openings 88, 88' according to FIGS. 9a, 9b, with a pump disk 80 as is shown in FIG. 3 and with a turbine disk 82 as is shown in FIG. 5. Accordingly, in a clutch arrangement 3 of this type, as an alternative or in addition to the passages 90, 90' normally provided, through-openings 88, 88' are provided which provide for an axial flow radially outside of the friction lining segments 62, 64 at the first friction elements 22 and for an axial flow radially inside the friction lining segments 62', 64' at the second friction elements 24.

Figure 6:
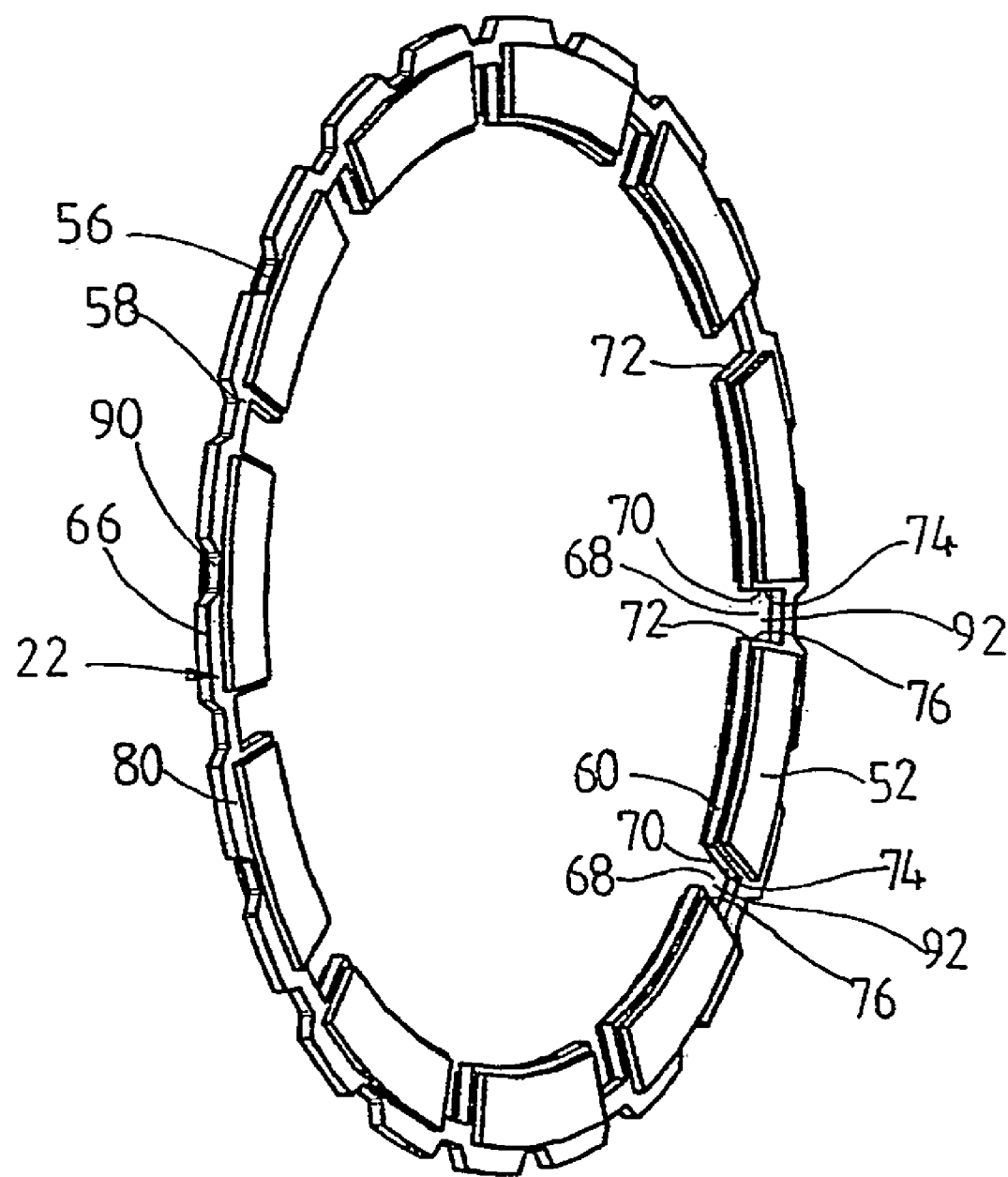
FIG. 6 shows a modification of the friction element shown in FIG. 3.
Figure 10B:
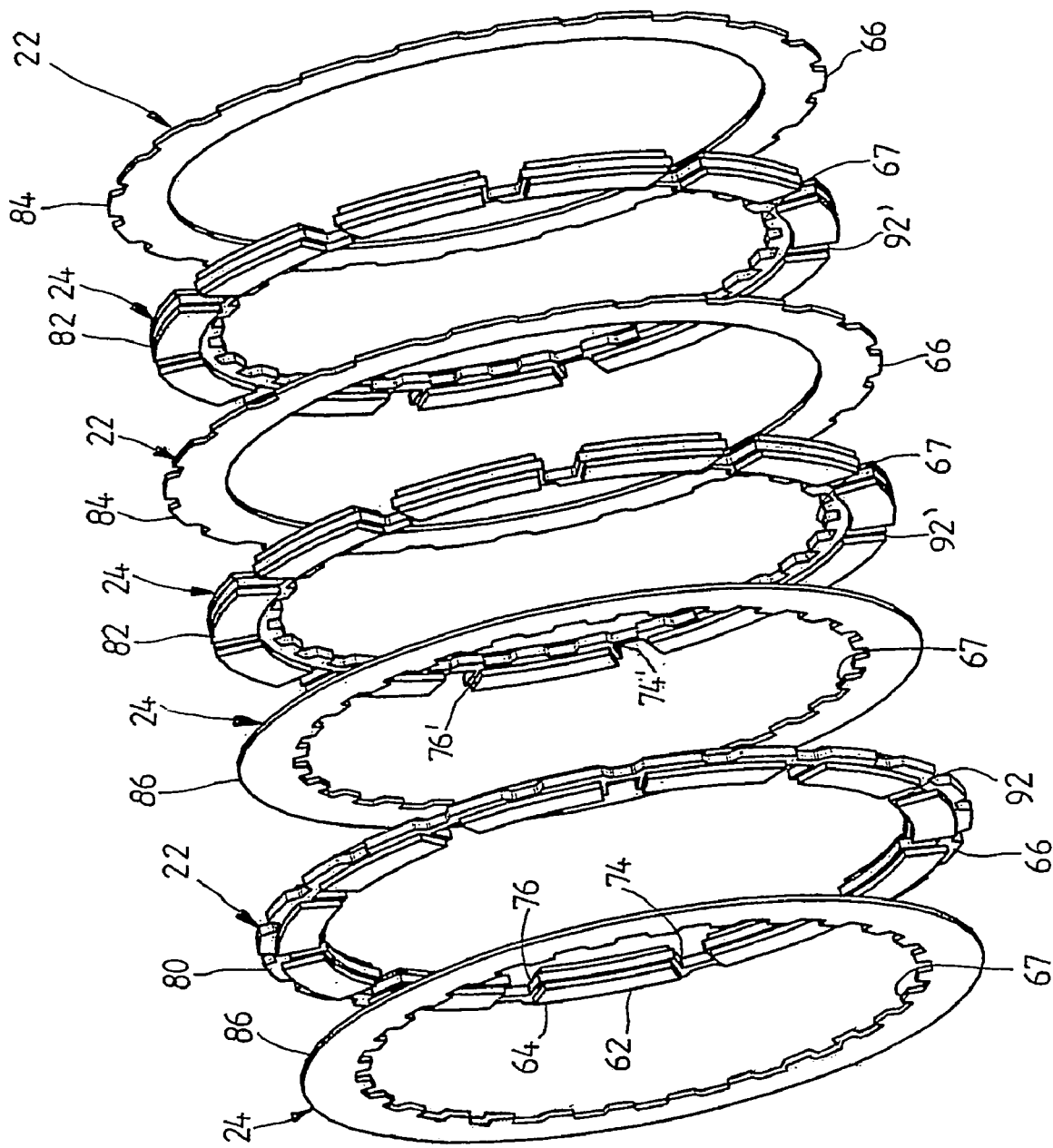
FIG. 10b shows an axial section from another clutch arrangement.

In an axially exploded view, FIG. 10b shows an axial section from a clutch arrangement 3 with friction elements 22 and 24 as shown in detail as individual elements in FIG. 6 or FIG. 8. In this case, a second friction element 24 constructed as an intermediate disk 86 can be brought into contact at both axial sides of a first friction element 22 which acts as a pump disk 80 due to the fact that it is constructed with friction lining segments 62, 64 at both sides, the radial outer diameter of this second friction element 24 being adapted substantially to the radial positions of the radial outer ends of the fluid delivery surfaces 74, 76 of the pump disk 80 and accordingly of the radial outer ends of the flow channels 92. The intermediate disk 86 on the right in FIG. 10b can in turn be brought into an operative connection with another turbine disk 82 and another intermediate disk 84 by means of a second friction element 24 acting as turbine disk 82 and another intermediate disk 84 acting as first friction element 22 as soon as the clutch arrangement 3 is loaded in the direction of an abutment element 30, shown in FIG. 2, by a clutch piston 32 shown by way of example in FIG. 2. It should be emphasized in this connection that the intermediate disks 22 with their radial inner diameters are adapted substantially to the radial positions of the radial inner ends of the fluid delivery surfaces 74', 76' and accordingly of the radial inner ends of the flow channels 93' of the turbine disks 82.

The rotating movement of the pump disk 80, turbine disk 82 and intermediate disks 84, 86 results in the following flow circuit:

Pumped medium is conveyed by the pump disk 80 through the flow channels 92 radially outward to the radial area of the carrier ring 58 and is there deflected axially in the direction of the adjacent intermediate disk 86. The pumped medium can pass the latter axially without difficulty since its outer diameter does not extend beyond the radial outer ends of the flow channels 92 of the pump disk 80. At the turbine disks 82, the pumped medium is conveyed radially inward through the flow channels 92' and is there deflected in the direction of the respective adjacent intermediate disk 84 which can also be passed by the pumped medium without difficulty since its inner diameter does not extend inward radially beyond the radial inner ends of the flow channels 92' of the turbine disks 82. Therefore, through-openings 88, 88' and passages 90 are not required in this construction.

Figure 13:
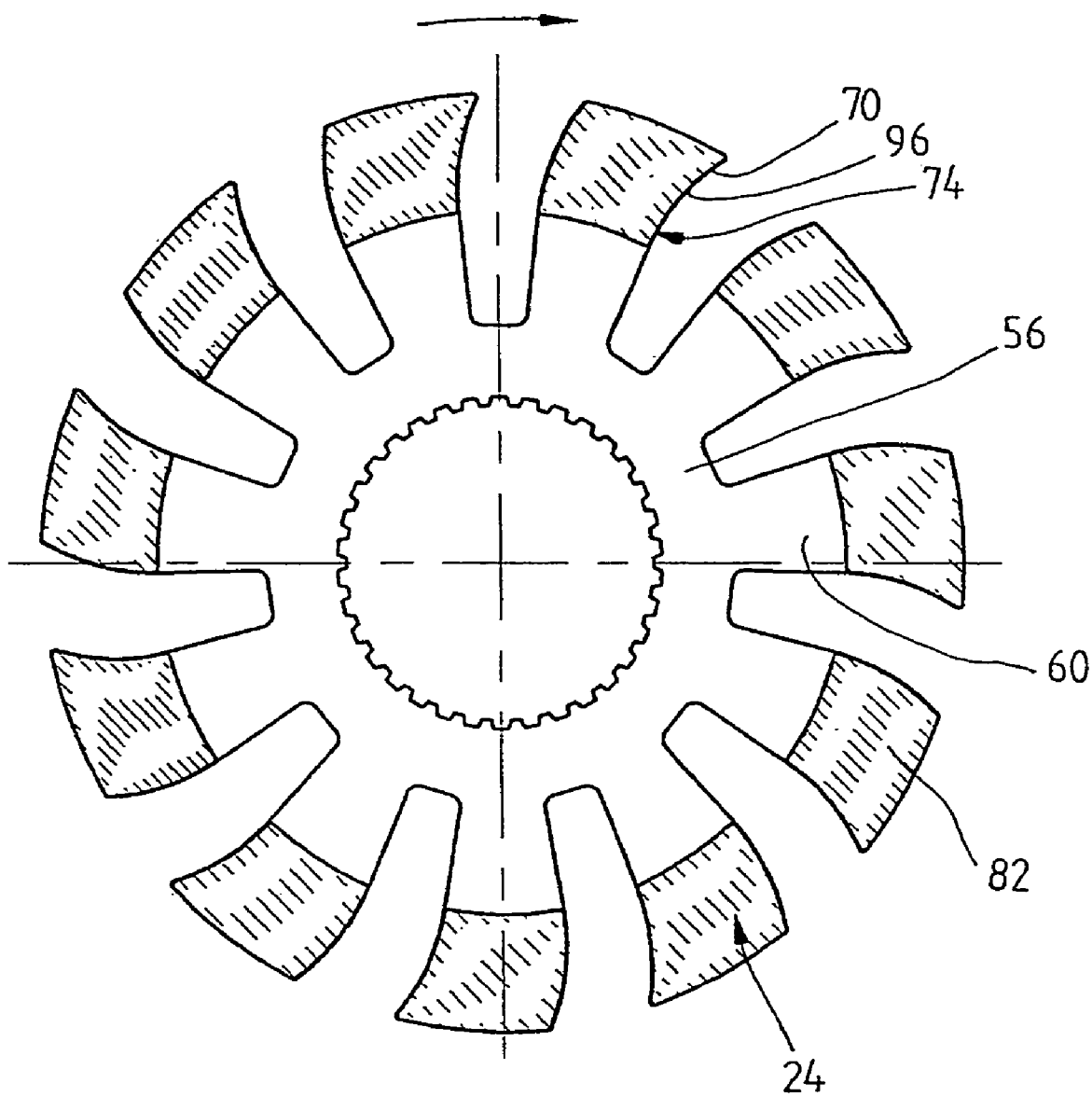
FIG. 13 shows the same view as FIG. 8, but with fluid delivery surfaces that are curved in the direction of rotation.
Figure 14:
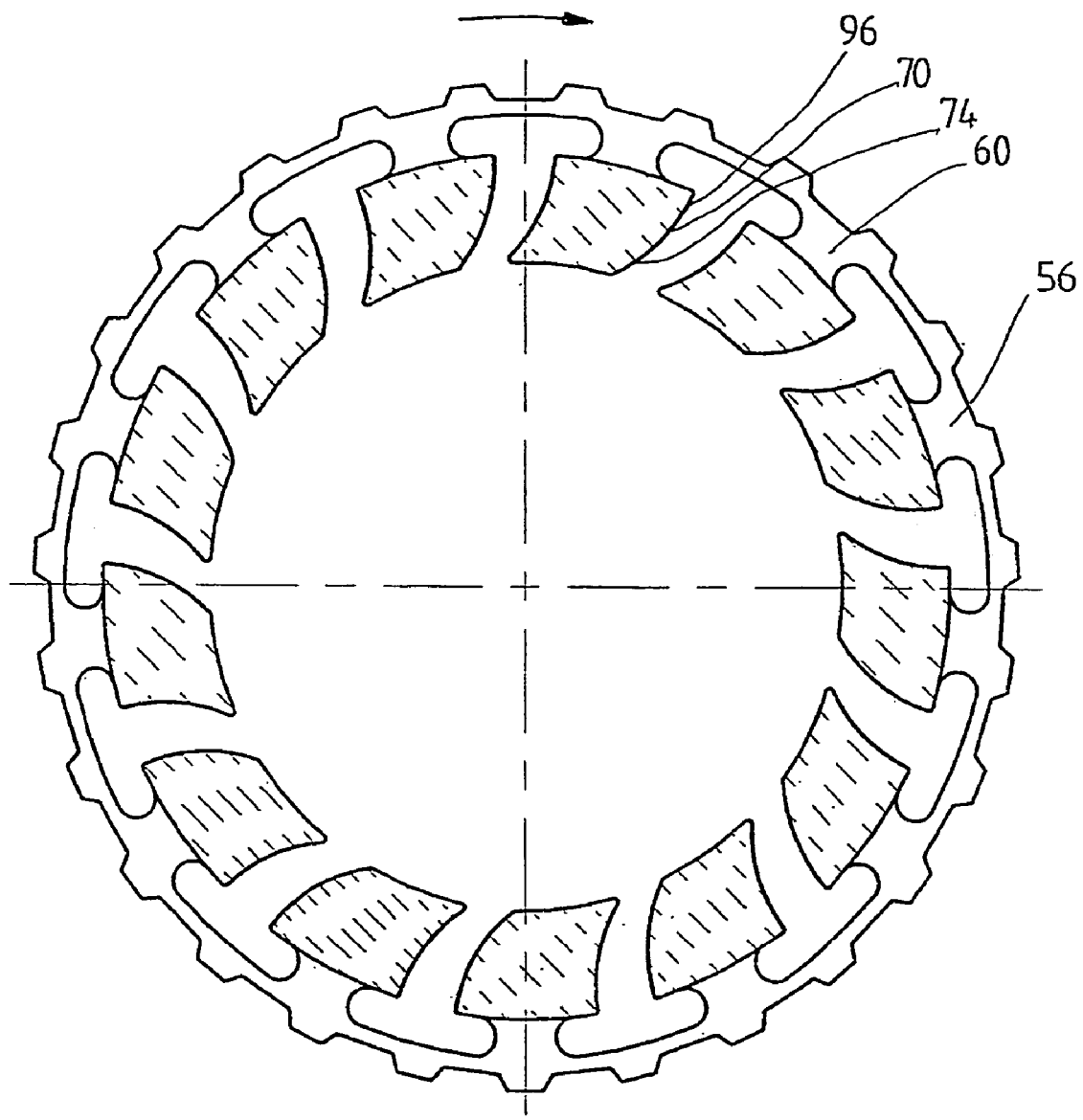
FIG. 14 shows the same view as FIG. 6, but with fluid delivery surfaces that are curved in the direction opposite to the rotating direction.

While each of the preceding constructions is based on a substantially radially planar construction of the fluid delivery surfaces, FIG. 13 shows support component segments 60 of a turbine wheel 82 having fluid delivery surfaces 74 that are constructed in a different manner. These fluid delivery surfaces 74 are formed with a curvature at their respective circumference-side terminating edges 70, which curvature projects in the direction of the rotating direction of the friction element indicated by an arrow. However, as is shown in FIG. 14, the circumference-side terminating edges 70 of the support component segments 60 can also recede in the rotating direction. In the latter case, the hydrodynamic proportion of volume flow that normally contributes approximately 15% to the total effect is reduced, while a fluid delivery surface that is curved in the rotating direction increases the hydrodynamic proportion. When this proportion is increased, although this is accompanied by a diminished ability to regulate the clutch characteristic, a creep behavior can be achieved; a reduced hydrodynamic proportion improves the ability to regulate the clutch arrangement.

Figure 12A:
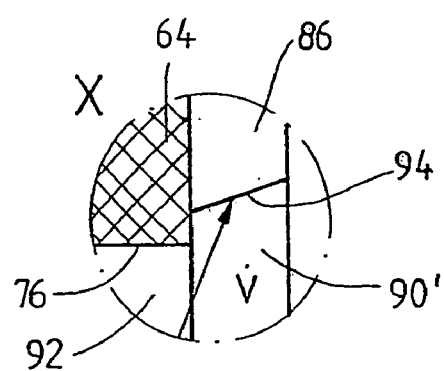
FIG. 12a shows an enlarged extract from the detail shown in dash-dot lines in FIG. 11, wherein the flow face is oriented at an angle.
Figure 12B:
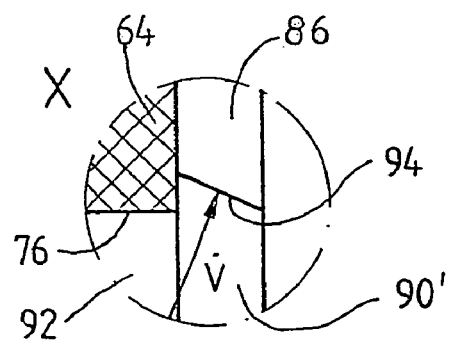
FIG. 12b shows the same view as FIG. 12a, but with a different angular orientation of the flow face.

Returning to FIG. 11, the circumference-side terminating edge 94 at the intermediate disk 86 is formed at right angles to the extension direction of the intermediate disk. However, it is also conceivable, according to FIG. 12a or FIG. 12b which show a detail X, to orient the circumference-side terminating edge 94 at a flow angle that can be predetermined, so that secondary flow effects and the course of the flow can be influenced directly at the counter-friction surface.

Because of the planar design of the first friction elements 22 and second friction elements 24, it is possible not only to optimally adjust the maximum torque transmission capability by influencing the area pressure by providing a corresponding quantity of friction lining segments 62, 62', 64, 64', but, beyond this, also to provide a clutch arrangement having optimal cooling characteristics by selecting the quantity of flow channels 92, 92' and their dimensioning in circumferential direction. Further, the oscillatory properties of the clutch arrangement 2 are optimized when the quantity of friction lining segments 62, 62', 64, 64' and, consequently, the quantity of flow channels 92, 92' is based on numbers that are not divisible by 2, preferably even higher prime numbers.

With regard to the friction linings themselves, they are preferably chosen depending on their selected material thickness. Insofar as a support component segment 60, 60' that is wide in axial direction has a very narrow friction lining segment 62, 62', 64, 64', paper linings are advantageous, whereas thicker friction lining segments 62, 62', 64, 64' on support component segments 60, 60' that are thinner in axial direction should preferably comprise friction linings made of composite material such as carbon fiber material. When a composite work material is used, thicker friction lining segments can withstand higher shear forces and torsional moments than paper linings.

What is claimed is:

1. A clutch arrangement for a motor vehicle, said arrangement comprising:
   a clutch housing filled with a pumped fluid, said clutch housing being rotatable about an axis of rotation;
   a plurality of first friction elements which are fixed against rotation with respect to said housing; and
   a plurality of second friction elements which are fixed against rotation with respect to a driven member which is rotatable about said axis of rotation, at least one of said second friction elements being frictionally engageable to rotate in common with at least one of said first friction elements;
   wherein at least one of said first and at least one of said second friction elements comprises a support component comprising a plurality of radially extending support component segments which are circumferentially separated by cutouts, each support component segment carrying at least one friction lining segment and having circumferentially opposed edges, one of said edges of each said support component segment forming a fluid delivery surface, said fluid delivery surfaces forming respective axially defined flow channels.

2. A clutch arrangement as in claim 1 wherein each said cutout has a radial dimension and each said support component has a thickness, each said fluid delivery surface having an area which depends on the radial dimension of the cutout and the thickness of the support component.

3. A clutch arrangement as in claim 1 wherein each said friction lining segment has a circumferential edge which is flush with the circumferential edge forming the fluid delivery surface of the respective support component segment, said circumferential edge of said friction lining segment forming part of said fluid delivery surface.

4. A clutch arrangement as in claim 1 wherein each said friction lining segment is arranged between a pair of opposed circumferential edges of one of the support component segments.

5. A clutch arrangement as in claim 1 wherein each said support component comprises a carrier ring from which the support component segments extend radially.

6. A clutch arrangement as in claim 5 wherein the carrier ring of the first friction element is formed with coupling projections that engage the housing to prevent relative rotation.

7. A clutch arrangement as in claim 6 wherein said coupling projections extend radially outward from said carrier ring of said first friction element and said support component segments of said first friction element extend radially inward from said carrier ring of said first friction element.

8. A clutch arrangement as in claim 6 wherein the carrier ring of the second friction element is formed with coupling projections which engage said driven member to prevent relative rotation.

9. A clutch arrangement as in claim 8 wherein said coupling projections extend radially inward from said carrier ring of said second friction element and said support component segments of said second friction element extend radially outward from said carrier ring of said second friction element.

10. A clutch arrangement as in claim 8 wherein the support component segments each have a radial dimension, said friction lining segments each extending over at least part of the radial dimension of the respective support component segments.

11. A clutch arrangement as in claim 10 wherein the support component segments each have a radial dimension, said friction lining segments each extending over the entire radial dimension of the respective support component segments.

12. A clutch arrangement as in claim 10 wherein the support component segments each have a radial outer edge, each said friction lining segment being flush with a respective said radial outer edge.

13. A clutch arrangement as in claim 11 wherein said support component segments each have a radial inner edge, each said friction lining segment being flush with a respective said radial inner edge.

14. A clutch arrangement as in claim 8 further comprising a passage for pumped medium located circumferentially between each pair of said coupling projections of each of said friction elements.

15. A clutch arrangement as in claim 14 wherein said housing has counter-coupling projections, coupling projections engaging between said counter-coupling projections and being radially longer than said counter-coupling projections.

16. A clutch arrangement as in claim 15 wherein some of said coupling projections are spaced so that there is no coupling projection between an adjacent pair of counter-coupling projections.

17. A clutch arrangement as in claim 14 wherein said support component segments are connected to respective said carrier rings by connections, at least one of said support components comprising through-openings between respective pairs of said connections.

18. A clutch arrangement as in claim 17 wherein said flow channels, said passages, and said through-openings cooperate to form fluid circulation loops.

19. A clutch arrangement as in claim 8 wherein each said carrier ring has an edge remote from the coupling projections, each said flow channel being limited radially by the edge of the respective said carrier ring.

20. A clutch arrangement as in claim 19 wherein said edge of said carrier ring of said first friction element lies on a radial outer diameter and said edge of said carrier ring of said second friction element lies on a radially inner diameter, said flow channels lying wholly inside of said outer diameter or wholly outside of said inner diameter.

21. A friction clutch as in claim 1 further comprising at least one intermediate disk arranged axially between two of said friction elements and having axially opposed sides facing respective friction lining segments, each said intermediate disk being fixed against rotation with respect to one of said housing and said driven member and facing at least one said friction element which is fixed against rotation with respect to the other of said housing and said driven member.

22. A friction clutch as in claim 14 further comprising at least one intermediate disk arranged axially between two of said friction elements and having axially opposed sides facing respective friction lining segments, each said intermediate disk being fixed against rotation with respect to one of said housing and said driven member and facing at least one said friction element which is fixed against rotation with respect to the other of said housing and said driven member, each said intermediate disk having passages which are axially aligned with the passages in said friction elements.

23. A friction clutch as in claim 17 further comprising at least one intermediate disk arranged axially between two of said friction elements and having axially opposed sides facing respective friction lining segments, each said intermediate disk being fixed against rotation with respect to one of said housing and said driven member and facing at least one said friction element which is fixed against rotation with respect to the other of said housing and said driven member, each said intermediate disk having through-openings which are axially aligned with the though-openings in said friction elements.

24. A friction clutch as in claim 20 further comprising at least one intermediate disk arranged axially between two of said friction elements and having axially opposed sides facing respective friction lining segments, each said intermediate disk being fixed against rotation with respect to one of said housing and said driven member and facing at least one said friction element which is fixed against rotation with respect to the other of said housing and said driven member, each said intermediate disk having one of a radially outer diameter which does not extend beyond the radially outer diameter of the carrier ring, a radially inner diameter which does not extend beyond the radially inner diameter of the carrier ring.

25. A friction clutch as in claim 21 wherein said support components and said friction lining segments form fluid delivery surfaces which have a substantially larger cross-section than the cross-section of the intermediate disks.

26. A friction clutch as in claim 25 wherein the first and second friction elements each have friction lining segments on both axial sides of the support component.

27. A friction clutch as in claim 26 wherein each axial side of each said friction element carries an odd number of friction lining segments, wherein said odd number is a prime number.

28. A friction clutch as in claim 1 wherein each said fluid delivery surface deviates from a radial plane.

29. A friction clutch as in claim 28 wherein each said fluid delivery surface is curved in a radial direction.

30. A friction clutch as in claim 28 wherein each said fluid delivery surface is curved in an axial direction.

* * * * *